(12) United States Patent
Munekata et al.

(10) Patent No.: US 7,665,740 B2
(45) Date of Patent: Feb. 23, 2010

(54) SEALING DEVICE FOR RECIPROCATING SHAFT

(75) Inventors: Shinobu Munekata, Fukushima (JP); Mitsugu Kobayashi, Fukushima (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 10/593,093

(22) PCT Filed: Mar. 17, 2005

(86) PCT No.: PCT/JP2005/004748
§ 371 (c)(1),
(2), (4) Date: Sep. 15, 2006

(87) PCT Pub. No.: WO2005/090838
PCT Pub. Date: Sep. 29, 2005

(65) Prior Publication Data
US 2007/0194538 A1 Aug. 23, 2007

(30) Foreign Application Priority Data
Mar. 23, 2004 (JP) .............................. 2004-084205

(51) Int. Cl.
*F16J 9/20* (2006.01)
*F16J 15/32* (2006.01)
(52) U.S. Cl. .................... 277/436; 277/437; 277/562
(58) Field of Classification Search ................ 277/436, 277/562, 566, 437
See application file for complete search history.

(56) References Cited

U.S. PATENT DOCUMENTS

| | | | | |
|---|---|---|---|---|
| 2,695,801 A * | 11/1954 | Kosatka | ........................ | 277/562 |
| 3,394,939 A * | 7/1968 | Mastro | ........................ | 277/309 |
| 4,300,778 A * | 11/1981 | Gagne | ........................ | 277/568 |
| 5,326,112 A * | 7/1994 | Paykin | ........................ | 277/575 |
| 5,346,230 A | 9/1994 | Schumacher et al. | ........ | 277/152 |
| 6,322,082 B1 * | 11/2001 | Paykin | ........................ | 277/549 |
| 6,511,075 B1 * | 1/2003 | Schmidt | ..................... | 277/436 |
| 6,612,582 B2 * | 9/2003 | Hosoda | ....................... | 277/436 |
| 2006/0185952 A1 * | 8/2006 | Kojima | .................. | 188/322.17 |
| 2007/0052180 A1 * | 3/2007 | Watanabe et al. | ........... | 277/551 |

FOREIGN PATENT DOCUMENTS

EP 0563439 A1 10/1993

(Continued)

*Primary Examiner*—Alison K Pickard
(74) *Attorney, Agent, or Firm*—Jacobson Holman PLLC

(57) ABSTRACT

A sealing device for a reciprocating shaft capable of providing sufficient pressure tightness to a main lip and preventing troublesomeness of an assembling operation. The sealing device, which is interposed between a shaft and an outer peripheral member, includes a washer, a main lip integrally bonded to a sealed space side of the washer and slidably brought into close contact with an outer peripheral surface of the shaft, an auxiliary lip integrally formed in an outer peripheral side thereof, a backup ring fitted between an atmosphere side of a slidable surface of the main lip and an inner peripheral portion of the washer, and bearing the main lip from the atmosphere side and the inner peripheral side, a dust lip integrally bonded to the atmosphere side of the washer and slidably brought into close contact with the outer peripheral surface of the shaft, and an outer peripheral lip integrally bonded to an outer peripheral portion of the washer and brought into close contact with the outer peripheral member.

1 Claim, 5 Drawing Sheets

FOREIGN PATENT DOCUMENTS

| | | |
|---|---|---|
| JP | 06-017939 | 1/1994 |
| JP | 10-082467 | 3/1998 |
| JP | 2000-046092 | 2/2000 |
| JP | 2003-106462 | 4/2003 |
| JP | 2003-130230 | 5/2003 |
| JP | 2003-294154 | 10/2003 |
| JP | 2004019866 A * | 1/2004 |
| JP | 2004-116549 | 4/2004 |
| JP | 2005-023966 | 1/2005 |

* cited by examiner

SEALING DEVICE FOR RECIPROCATING SHAFT

This is a nationalization of PCT/JP2005/004748 filed Mar. 17, 2005 and published in Japanese.

BACKGROUND OF THE INVENTION

1. Field of the Invention

The present invention relates to a sealing device for a reciprocating shaft which seals an axial periphery of the reciprocating shaft, for example, a piston rod of a hydraulic shock absorber of a vehicle or the like.

2. Description of the Conventional Art

As a typical prior art of the sealing device for the reciprocating shaft used in the hydraulic shock absorber of the vehicle, for example, there is a structure described in Japanese Unexamined Patent Publication No. 10-82467, (patent document 1) and Japanese Unexamined Patent Publication No. 2000-46092, (patent document 2).

FIG. 5 is a half sectional view showing a conventional sealing device 100 for a reciprocating shaft of the same kind as described in the patent document 1 mentioned above by cutting along a plane passing through an axis together with a part of the hydraulic shock absorber. In particular, the sealing device 100 is structured such that a main lip 102, a dust lip 103 and an outer peripheral lip 104 are integrally formed by a rubber-like elastic material with a metal washer 101 held between a caulked end portion 110a of a cylinder 110 of the hydraulic shock absorber and a rod guide 111. The main lip 102 and the dust lip 103 are brought into slidable contact with an outer peripheral of a rod 112 corresponding to a reciprocating shaft, and the outer peripheral lip 104 is brought into slidable contact with an inner peripheral surface of the cylinder 110.

Since the sealing device 100 provided with the structure mentioned above integrally has the main lip 102, the dust lip 103 and the outer peripheral lip 104 made of the rubber-like elastic material, in the washer 101, the sealing device 100 can be inexpensively provided. In the structure mentioned above, it is effective to make an inner diameter of the washer 101 small so as to be close to an outer diameter of the rod 112, as a method of improving a pressure tightness of the main lip 102 for sealing a working fluid inside the hydraulic shock absorber. However, there is a limit to make the inner diameter of the washer 101 small, in view of formability of the main lip 102.

Accordingly, in order to sufficiently improve the pressure tightness of the main lip 102, it is effective to support a back face side and an inner peripheral side of the main lip by a backup ring made of a synthetic resin, as described in the patent document 2. However, since the backup ring is held between an oil seal having the main lip and a dust seal provided in the washer in an outer side of the oil seal, the number of parts is increased and troublesomeness is caused in an assembling work.

SUMMARY OF THE INVENTION

Problem to be Solved by the Invention

The present invention is made by taking the points mentioned above into consideration, and a technical problem of the present invention is to provide a sealing device for a reciprocating shaft, which has a sufficient pressure tightness of a main lip and does not cause troublesomeness of an assembling work.

Means For Solving The Problem

As a means for effectively solving the technical problem mentioned above, in accordance with a first aspect of the present invention, there is provided a sealing device for a reciprocating shaft, the sealing device being interposed between a shaft reciprocating in an axial direction and an outer peripheral member surrounding an outer periphery thereof, comprising a washer;

a main lip integrally bonded to a sealed space side of the washer and slidably brought into close contact with an outer peripheral surface of the shaft;

a backup ring fitted to a portion between an atmosphere side of the slidable surface of the main lip and an inner peripheral portion of the washer and bearing the main lip from the atmosphere side and the inner peripheral side;

a dust lip integrally bonded to the atmosphere side of the washer and slidably brought into close contact with the outer peripheral surface of the shaft; and an outer peripheral lip integrally bonded to the outer peripheral portion of the washer and brought into close contact with the outer peripheral member.

As another means for effectively solving the technical problem mentioned above, in accordance with a second aspect of the present invention, there is provided a sealing device for a reciprocating shaft, the sealing device being interposed between a shaft reciprocating in an axial direction and an outer peripheral member surrounding an outer periphery thereof, comprising a washer;

a main lip closely fitted to an inner peripheral surface of a main lip holding concave portion formed in a sealed space side in an inner peripheral portion of the washer and slidably brought into close contact with an outer peripheral surface of the shaft;

a backup ring fitted to a portion between an atmosphere side of the slidable surface of the main lip and a rising surface of the main lip holding concave portion and bearing the main lip from the atmosphere side and the inner peripheral side;

a dust lip integrally bonded to the atmosphere side of the washer and slidably brought into close contact with the outer peripheral surface of the shaft; and an outer peripheral lip integrally bonded to the outer peripheral portion of the washer and brought into close contact with the outer peripheral member.

As another means for effectively solving the technical problem mentioned above, in accordance with a third aspect of the present invention, there is provided a sealing device for a reciprocating shaft, the sealing device being interposed between a shaft reciprocating in an axial direction and an outer peripheral member surrounding an outer periphery thereof, comprising a washer;

an auxiliary washer fitted to a sealed space side of the washer;

a main lip integrally bonded to a sealed space side in an inner peripheral portion of the auxiliary washer and slidably brought into close contact with an outer peripheral surface of the shaft;

an outer peripheral lip integrally bonded to an outer peripheral portion of the auxiliary washer and brought into close contact with the outer peripheral member;

a backup ring fitted to a portion between an atmosphere side of the slidable surface of the main lip and an inner peripheral portion of the washer and bearing the main lip from the atmosphere side and the inner peripheral side; and a dust lip integrally bonded to the atmosphere side of the washer and slidably brought into close contact with the outer peripheral surface of the shaft.

EFFECT OF THE INVENTION

In accordance with the sealing device for the reciprocating shaft on the basis of the first aspect of the present invention, since the main lip directed to the sealed space side is borne by the backup ring from the inner peripheral side and the atmosphere side, it is possible to effectively suppress an increase of tension force of the main lip applied to the outer peripheral surface of the reciprocating shaft, and it is possible to sufficiently improve a pressure tightness of the main lip without making an inner diameter of the washer close to an outer diameter of the shaft. Further, since the main lip, the dust lip and the outer peripheral lip are integrally bonded by vulcanization to the washer, and the backup ring is held between the main lip and the washer, the number of parts is reduced and it is possible to easily install them in an assembly of the hydraulic shock absorber.

In accordance with the sealing device for the reciprocating shaft on the basis of the second aspect of the present invention, since the main lip directed to the sealed space side is borne by the backup ring from the inner peripheral side and the atmosphere side, it is possible to effectively suppress an increase of tension force of the main lip applied to the outer peripheral surface of the reciprocating shaft, and it is possible to sufficiently improve a pressure tightness of the main lip without making an inner diameter of the washer close to an outer diameter of the shaft. Further, since the dust lip and the outer peripheral lip are integrally bonded by vulcanization to the washer, the main lip is held in the main lip holding concave portion in the washer, and the backup ring is fitted to the portion between the main lip and the main lip holding concave portion so as to be held, it is possible to easily install them in an assembly of the hydraulic shock absorber.

In accordance with the sealing device for the reciprocating shaft on the basis of the third aspect of the present invention, since the main lip directed to the sealed space side is borne by the backup ring from the inner peripheral side and the atmosphere side, it is possible to effectively suppress an increase of tension force of the main lip applied to the outer peripheral surface of the reciprocating shaft, and it is possible to sufficiently improve a pressure tightness of the main lip without making an inner diameter of the auxiliary washer close to an outer diameter of the shaft. Further, since the molded body constituted by the washer and the dust lip, and the molded body constituted by the auxiliary washer, the main lip and the outer peripheral lip are integrated on the basis of the fitting between the washer and the auxiliary washer, and the backup ring is fitted to the portion between the main lip and the washer so as to be held, it is possible to easily install them in an assembly of the hydraulic shock absorber.

Figure 1:
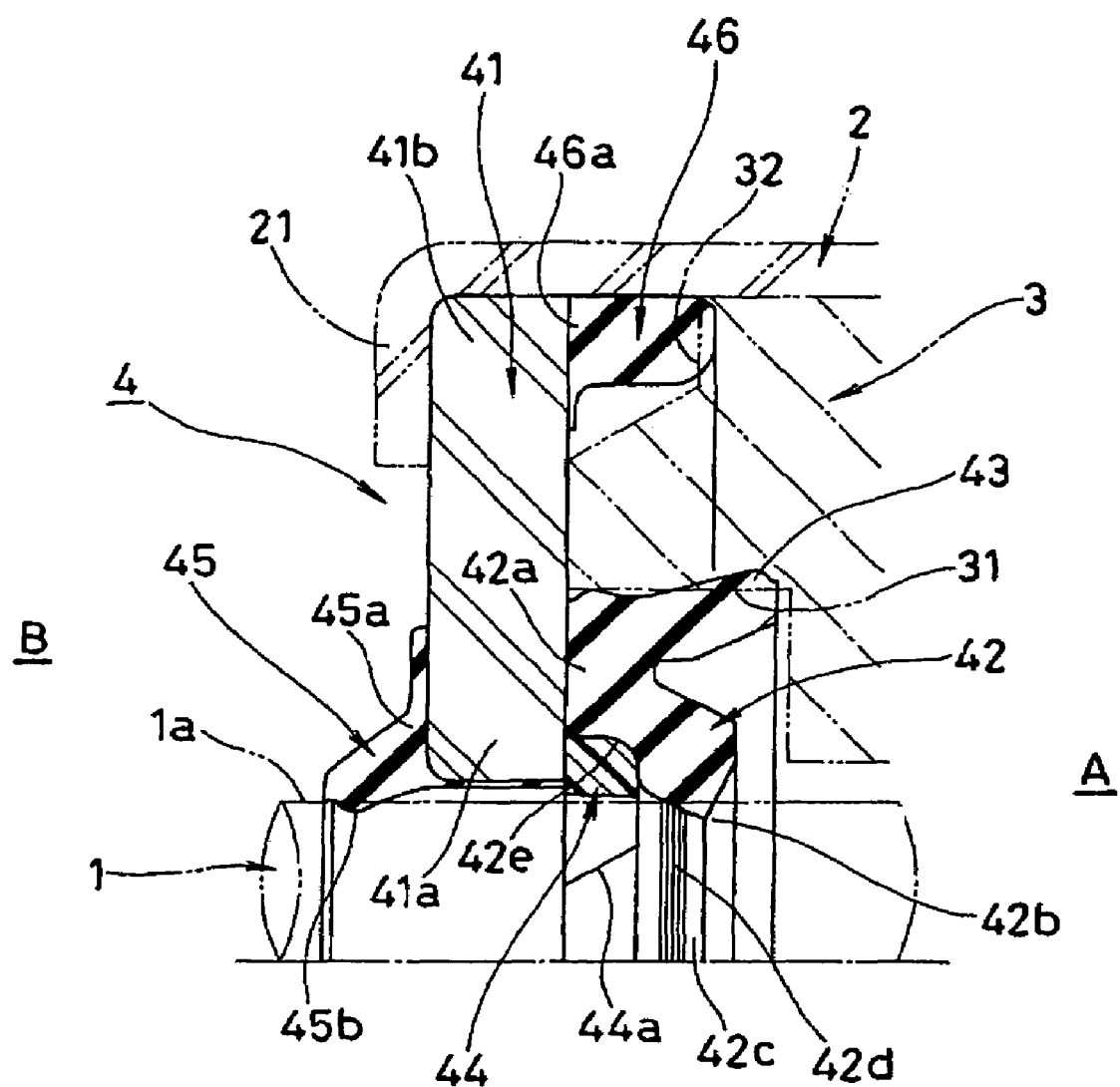
FIG. 1 is a half sectional view showing a first embodiment of a sealing device for a reciprocating shaft in accordance with the present invention by cutting along a plane passing through an axis together with a part of a hydraulic shock absorber.

EXPLANATION OF REFERENCE NUMERALS 1 rod (shaft)
2 cylinder (outer peripheral member)
3 rod guide
31 inner peripheral step portion
32 outer peripheral step portion
4 sealing device
41 washer
41a inner peripheral portion
41b outer peripheral portion
41c main lip holding concave portion
42 main lip
42a base portion
42e supported surface
42f reinforcing ring
43 auxiliary lip
44 backup ring
44a cut portion
45 dust lip
46 outer peripheral lip
47 auxiliary washer
A sealed space
B atmosphere

DETAILED DESCRIPTION OF PREFERRED EMBODIMENT

A description will be in detail given below of a preferable embodiment of a sealing device for a reciprocating shaft in accordance with the present invention with reference to the accompanying drawings. First, FIG. 1 is a half sectional view showing a first embodiment of a sealing device for a reciprocating shaft in accordance with the present invention by cutting along a plane passing through an axis together with a part of a hydraulic shock absorber.

In FIG. 1, reference numeral 1 denotes a rod of a hydraulic shock absorber. The rod 1 corresponds to a shaft described in the first to third aspects of the present invention. Reference numeral 2 denotes a cylinder arranged so as to surround an outer periphery of the rod 1. The cylinder 2 corresponds to an outer peripheral member described in the first to third aspects of the present invention. Reference numeral 3 denotes a rod guide fixed to an inner periphery of the cylinder 2. An inner peripheral surface of the rod guide 3 closely faces to an outer peripheral surface of the rod 1. Further, reference symbol A denotes a sealed space corresponding to an inner portion of the hydraulic shock absorber, and reference symbol B denotes an atmosphere in an outer portion of the hydraulic shock absorber.

A sealing device 4 in accordance with the first embodiment of the present invention is interposed between the rod 1 and an end portion of the cylinder 2, and is provided with a washer 41, a main lip 42 arranged in the sealed space A side of the washer 41 and slidably brought into close contact with an outer peripheral surface 1a of the rod 1, an auxiliary lip 43 integrally formed in an outer peripheral side thereof, a backup ring 44 fitted to a portion between an inner peripheral portion of the main lip 42 and an inner peripheral portion of the washer 41 and bearing the main lip 42 from the atmosphere B side and an inner peripheral side, a dust lip 45 integrally bonded to the atmosphere B side of the washer 41 and slidably brought into close contact with the outer peripheral surface 1a of the rod 1, and an outer peripheral lip 46 integrally bonded to an outer peripheral portion of the washer 41 and brought into close contact with an inner surface of the cylinder 2.

The washer 41 is manufactured by punching a thick metal plate in a donut shape, and is held between an inward collar portion 21 formed in the end portion of the cylinder 2 so as to be bent to an inner peripheral side, and the rod guide 3.

The main lip 42, the auxiliary lip 43, the dust lip 45 and the outer peripheral lip 46 are all molded by vulcanization with a rubber-like elastic material, and is integrally bonded by vulcanization to the washer 41. In other words, the main lip 42, the auxiliary lip 43, the dust lip 45 and the outer peripheral lip 46 are bonded by vulcanization to the washer 41 at the same time of being molded, by setting the washer 41, to which a vulcanization adhesive agent is previously applied, within a predetermined metal mold for a rubber vulcanization molding, charging an unvulcanized rubber material into an annular cavity defined between the washer 41 and an inner surface of the metal mold on the basis of mold clamping, and heating and pressurizing it.

The main lip 42 extends toward the sealed space A side from a base portion 42a bonded by vulcanization to a surface in the sealed space A side near an inner peripheral portion 41a of the washer 41, and a seal edge portion 42b formed in an inner periphery of a leading end thereof and a slidable surface 42c extending to the atmosphere B side therefrom are slidably brought into close contact with the outer peripheral surface 1a of the rod 1 with a proper fastening margin. Further, a plurality of grooves or protrusions 42d provided continuously in a circumferential direction for lubricating are formed in the slidable surface 42c.

The auxiliary lip 43 has the base portion 42a of the main lip 42 in common, that is, the auxiliary lip 43 extends to an outer peripheral side of the main lip 42 from the base portion 42a, and an outer peripheral portion of a leading end of the auxiliary lip 43 is brought into close contact with an inner peripheral surface of an inner peripheral step portion 31 formed in an inner periphery of a contact portion with the washer 41 in the rod guide 3 so as to be continuous in a circumferential direction, with a proper fastening margin.

The dust lip 45 extends toward the atmosphere B side from a base portion 45a bonded by vulcanization to the surface in the atmosphere B side near the inner peripheral portion 41a of the washer 41, and an inner peripheral portion 45b of a leading end thereof is slidably brought into close contact with the outer peripheral surface 1a of the rod 1 with a proper fastening margin.

The outer peripheral lip 46 extends toward the sealed space A side from a base portion 46a vulcanization-bonded to the surface in the sealed space A side in the outer peripheral portion 41b of the washer 41, and is brought into close contact with an outer peripheral step portion 32 formed in an outer periphery of the contact portion with the washer 41 in the rod guide 3 so as to be continuous in a circumferential direction, and an inner surface of the cylinder 2, with a proper fastening margin.

The backup ring 44 is formed with a low-friction synthetic resin material such as a polytetrafluorethylene (PTFE) or the like which is excellent in an abrasion resistance and has a low friction coefficient, and is fitted to a portion between a stepshaped supported surface 42e formed in the atmosphere B side of the slidable surface 42c of the main lip 42 so as to be continuous in a circumferential direction, and the inner peripheral portion 41a of the washer 41. Since the backup ring 44 is formed with the synthetic resin material, the backup ring 44 has a rigidity required for bearing the main lip 42, however, since the backup ring 44 has a cut portion (a bias cut) 44a at one position in the circumferential direction, the backup ring 44 can be easily fitted to the portion between the supported surface 42e and the inner peripheral portion 41a of the washer 41, by being deflected in a contracted direction.

In the sealing device 4 in accordance with the first embodiment structured as mentioned above, the main lip 42 is slidably brought into close contact with the outer peripheral surface 1a of the rod 1, thereby preventing an internal sealed oil in the sealed space A from leaking to the atmosphere B side through the outer periphery of the rod 1. The auxiliary lip 43 is structured such as to seal the internal sealed oil between the rod guide 3 and the washer 41. The outer peripheral lip 46 is structured such as to seal the internal sealed oil between the cylinder 2 and the washer 41. The dust lip 45 is slidably brought into close contact with the outer peripheral surface 1a of the rod 1, thereby preventing a dust and a muddy water in the atmosphere B side from making an intrusion into the sealed space A through the outer periphery of the rod 1.

In this case, the main lip 42 is directed to the sealed space A side. Accordingly, if a hydraulic pressure in the sealed space A is increased in accordance that a piston (not shown) in an inner portion of the hydraulic shock absorber moves in an axial direction together with the rod 1, the hydraulic pressure acts on the main lip 42 in such a manner as to increase the tension force applied to the outer peripheral surface 1a of the rod 1. However, since the main lip 42 is backed up from the inner peripheral side and the atmosphere A side by the backup ring 44 made of the synthetic resin material, it is possible to effectively suppress an increase of the tension force of the main lip 42 with respect to the outer peripheral surface 1a of the rod 1. As a result, it is possible to sufficiently improve a pressure tightness of the main lip 42 without making the inner diameter of the washer 41 close to the outer diameter of the rod 1.

Further, the sealing apparatus 4 is structured such that the main lip 42, the auxiliary lip 43, the dust lip 45 and the outer peripheral lip 46 are integrally bonded by vulcanization to the washer 41, and the backup ring 44 is previously held between the main lip 42 and the washer 41, the number of parts is reduced, and it is possible to easily install it at a time of assembling the hydraulic shock absorber.

Figure 2:
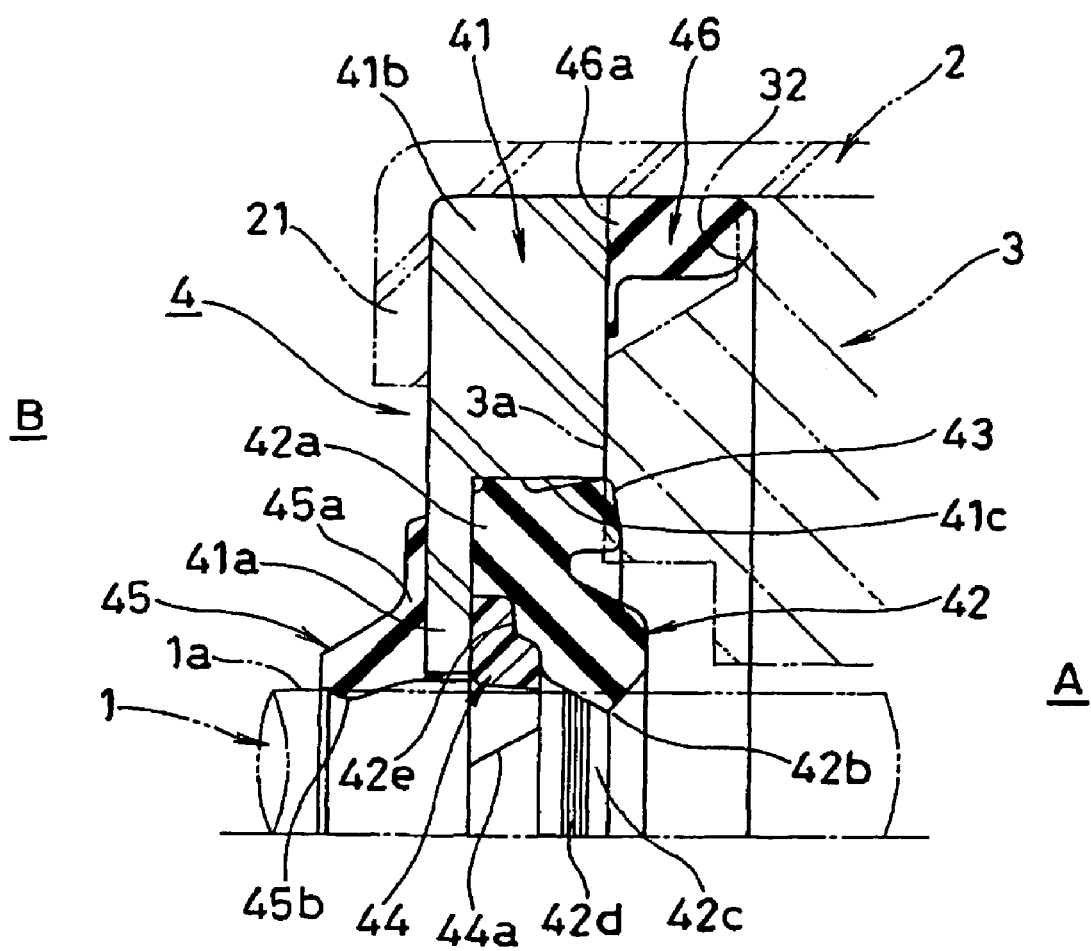
FIG. 2 is a half sectional view showing a second embodiment of a sealing device for a reciprocating shaft in accordance with the present invention by cutting along a plane passing through an axis together with a part of a hydraulic shock absorber.

Next, FIG. 2 is a half sectional view showing a second embodiment of a sealing device for a reciprocating shaft in accordance with the present invention by cutting along a plane passing through an axis together with a part of a hydraulic shock absorber.

The sealing device 4 in accordance with the second embodiment of the present invention is interposed between the rod 1 and an end portion of the cylinder 2, and is provided with the washer 41, the main lip 42 closely fitted to an inner peripheral surface of a main lip holding concave portion 41c formed in the sealed space A side in the inner peripheral portion 41a of the washer 41 and slidably brought into close contact with the outer peripheral surface 1a of the rod 1, the auxiliary lip 43 integrally formed in the outer peripheral side thereof, the backup ring 44 fitted to the portion between the inner peripheral portion of the main lip 42 and the inner peripheral portion of the washer 41 and bearing the main lip 42 from the atmosphere B side and the inner peripheral side, the dust lip 45 integrally bonded to the atmosphere B side of the washer 41 and slidably brought into close contact with the outer peripheral surface 1a of the rod 1, and the outer peripheral lip 46 integrally bonded to the outer peripheral portion 41b of the washer 41 and brought into close contact with the inner surface of the cylinder 2.

The washer 41 is manufactured by punching the thick metal plate in a donut shape, and is held between the inward collar portion 21 formed in the end portion of the cylinder 2 so as to be bent to the inner peripheral side, and the rod guide 3. The main-lip holding concave portion 41c formed in a hollowed shape from the sealed space A side and provided continuously in the circumferential direction is formed in the inner peripheral portion 41a of the washer 41.

The main lip 42 (and the auxiliary lip 43 integrally formed with the main lip 42) are molded by vulcanization with the rubber-like elastic material such as the fluorine-contained rubber which is excellent in the abrasion resistance, and is formed as a different member from the washer 41. The base portion 42a thereof is brought into close contact with the rising surface in the diametrical direction of the main lip holding concave portion 41c of the washer 41, and the auxiliary lip 43 extending to the outer peripheral side of the main lip 42 from the base portion 42a is fitted and held in a state of being brought into close contact with the cylindrical inner peripheral surface of the main lip holding concave portion 41c. The auxiliary lip 43 has the proper fastening margin with respect to the end surface 3a of the rod guide 3 pressing the washer 41. Further, the seal edge portion 42b formed in the inner periphery of the leading end of the main lip 42 extending toward the sealed space A side from the base portion 42a and the slidable surface 42c extending to the atmosphere B side therefrom are slidably brought into close contact with the outer peripheral surface 1a of the rod 1 with a proper fastening margin. Further, a plurality of grooves or protrusions 42d provided continuously in a circumferential direction for lubricating are formed in the slidable surface 42c.

The dust lip 45 and the outer peripheral lip 46 are molded by vulcanization with the rubber-like elastic material, and is integrally bonded by vulcanization to the washer 41. In other words, the dust lip 45 and the outer peripheral lip 46 are bonded by vulcanization to the washer 41 at the same time of being molded, by setting the washer 41, to which a vulcanization adhesive agent is previously applied, within a predetermined metal mold for the rubber vulcanization molding, charging an unvulcanized rubber material into the annular cavity defined between the washer 41 and the inner surface of the metal mold on the basis of mold clamping, and heating and pressurizing it.

The dust lip 45, the outer peripheral lip 46 and the backup ring 44 are structured basically in the same manner as the first embodiment described above. In other words, the dust lip 45 directed to the atmosphere B side is structured such that the leading end inner peripheral portion 45b is slidably brought into close contact with the outer peripheral surface 1a of the rod 1 with a proper fastening margin. The outer peripheral lip 46 directed to the sealed space A side is brought into close contact with the outer peripheral step portion 32 formed in the outer periphery of the contact portion with the washer 41 in the rod guide 3 so as to be continuous in the circumferential direction, and the inner surface of the cylinder 2 with a proper fastening margin. The backup ring 44 is molded by the low-friction synthetic resin material such as the PTFE or the like, has the cut portion 44a at one position in the circumferential direction, and is fitted to the portion between the supported surface 42e formed in the inner peripheral portion of the main lip 42 and the rising surface in the diametrical direction of the main lip holding concave portion 41c in the washer 41.

In the sealing device 4 in accordance with the second embodiment structured as mentioned above, the main lip 42 is slidably brought into close contact with the outer peripheral surface 1a of the rod 1, thereby preventing the internal sealed oil in the sealed space A from leaking to the atmosphere B side through the outer periphery of the rod 1. The auxiliary lip 43 is structured such as to fit and fix the main lip 42 to the main lip holding concave portion 41c in the washer 41 in the sealing manner, and seal the internal sealed oil between the rod guide 3 and the washer 41. The outer peripheral lip 46 is structured such as to seal the internal sealed oil between the cylinder 2 and the washer 41. The dust lip 45 is slidably brought into close contact with the outer peripheral surface 1a of the rod 1, thereby preventing the dust and the muddy water in the atmosphere B side from making an intrusion into the sealed space A through the outer periphery of the rod 1.

Since the main lip 42 is backed up from the inner peripheral side and the atmosphere A side by the backup ring 44 made of the synthetic resin material, it is possible to effectively suppress an increase of the tension force of the main lip 42 with respect to the outer peripheral surface 1a of the rod 1 at a time when the hydraulic pressure in the sealed space A is increased. As a result, it is possible to sufficiently improve a pressure tightness of the main lip 42 without making the inner diameter of the washer 41 close to the outer diameter of the rod 1.

Further, since the sealing apparatus 4 is structured such that the dust lip 45 and the outer peripheral lip 46 are integrally bonded by vulcanization to the washer 41, the main lip 42 (and the auxiliary lip 43 integrally formed therewith) are previously held to the main lip holding concave portion 41c in the washer 41 via the auxiliary lip 43, and the backup ring 44 is fitted to the portion between the main lip 42 and the main lip holding concave portion 41c so as to be held, it is possible to easily install it at a time of assembling the hydraulic shock absorber.

Figure 3:
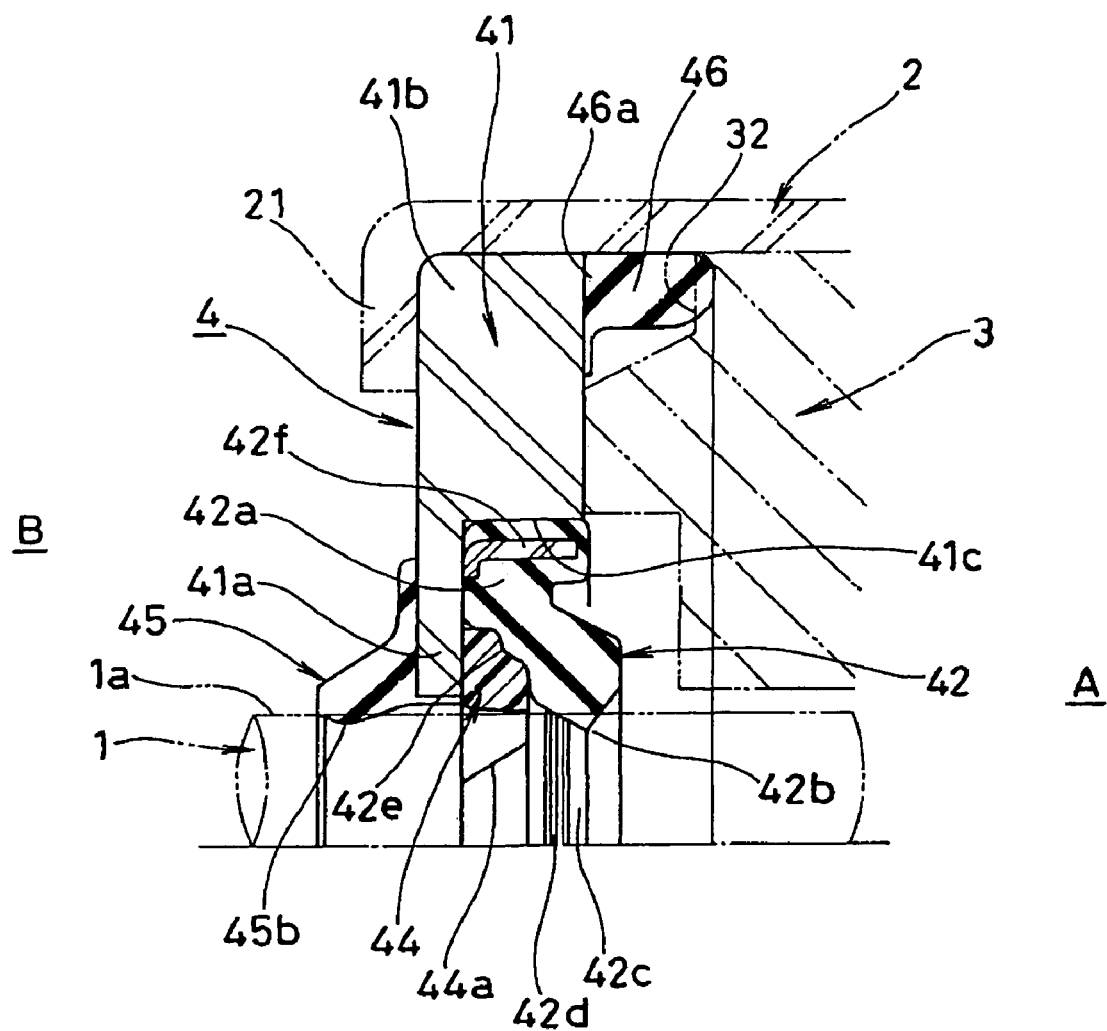
FIG. 3 is a half sectional view showing a third embodiment of a sealing device for a reciprocating shaft in accordance with the present invention by cutting along a plane passing through an axis together with a part of a hydraulic shock absorber.

Next, FIG. 3 is a half sectional view showing a third embodiment of a sealing device for a reciprocating shaft in accordance with the present invention by cutting along a plane passing through an axis together with a part of a hydraulic shock absorber.

The sealing device 4 in accordance with the third embodiment of the present invention is structured such that the auxiliary lip 43 in the second embodiment mentioned above is abolished, and the base portion 42a of the main lip 42 is pressure-inserted to the cylindrical inner peripheral surface of the main lip holding concave portion 41c in the washer 41, as shown in FIG. 3. In this case, a metal reinforcing ring 42f for reinforcing a fitting force is buried in the base portion 42a. The other portions are the same as those of the second embodiment in FIG. 2.

The sealing device 4 in accordance with the third embodiment structured as mentioned above achieves the same effects as those of the second embodiment. Since the dust lip 45 and the outer peripheral lip 46 are integrally bonded by vulcanization to the washer 41, the main lip 42 is previously held to the main lip holding concave portion 41c in the washer 41 in accordance with the pressure insertion, and the backup ring 44 is fitted to the portion between the main lip 42 and the main lip holding concave portion 41c so as to be held, it is possible to easily install it at a time of assembling the hydraulic shock absorber.

Figure 4:
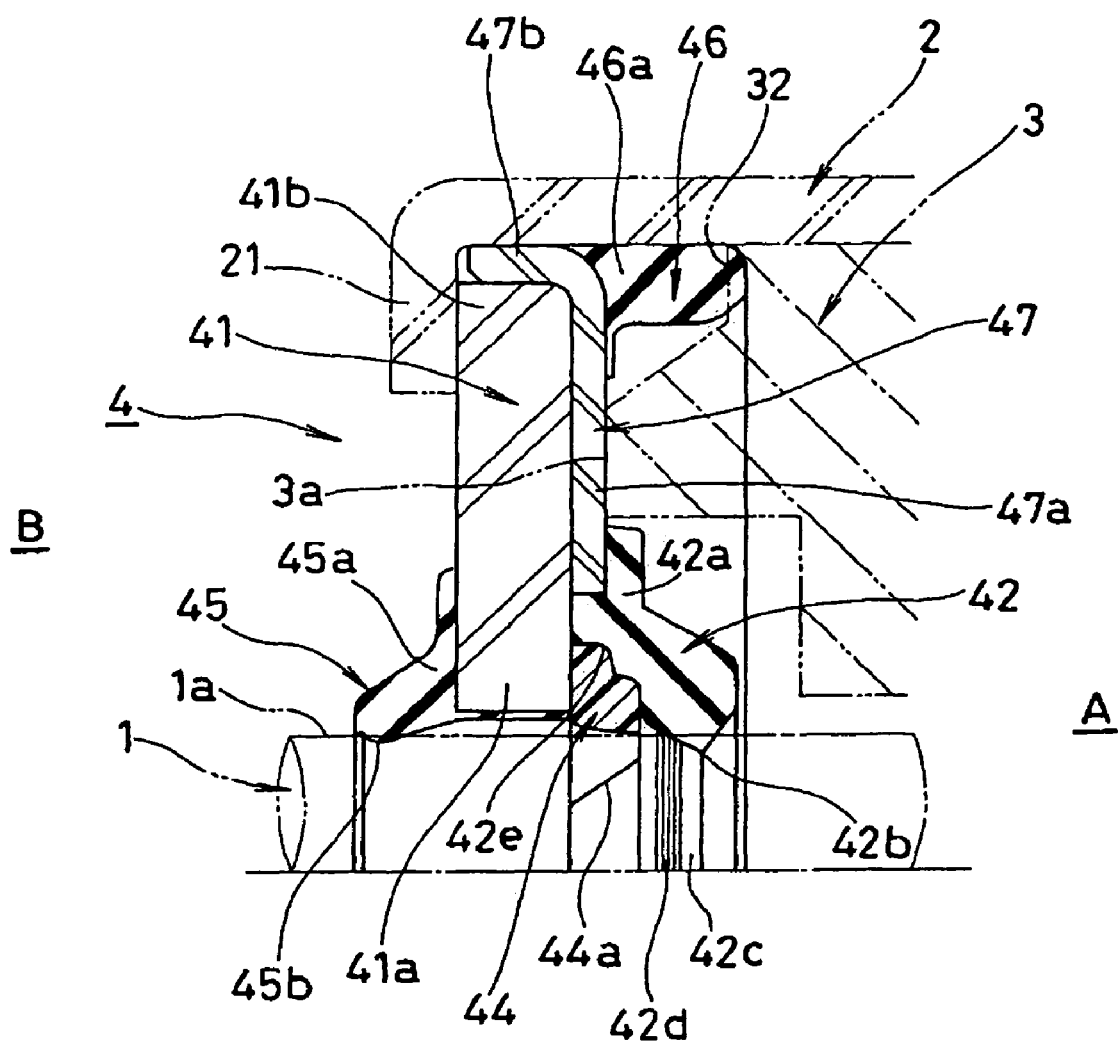
FIG. 4 is a half sectional view showing a fourth embodiment of a sealing device for a reciprocating shaft in accordance with the present invention by cutting along a plane passing through an axis together with a part of a hydraulic shock absorber.
Figure 5:
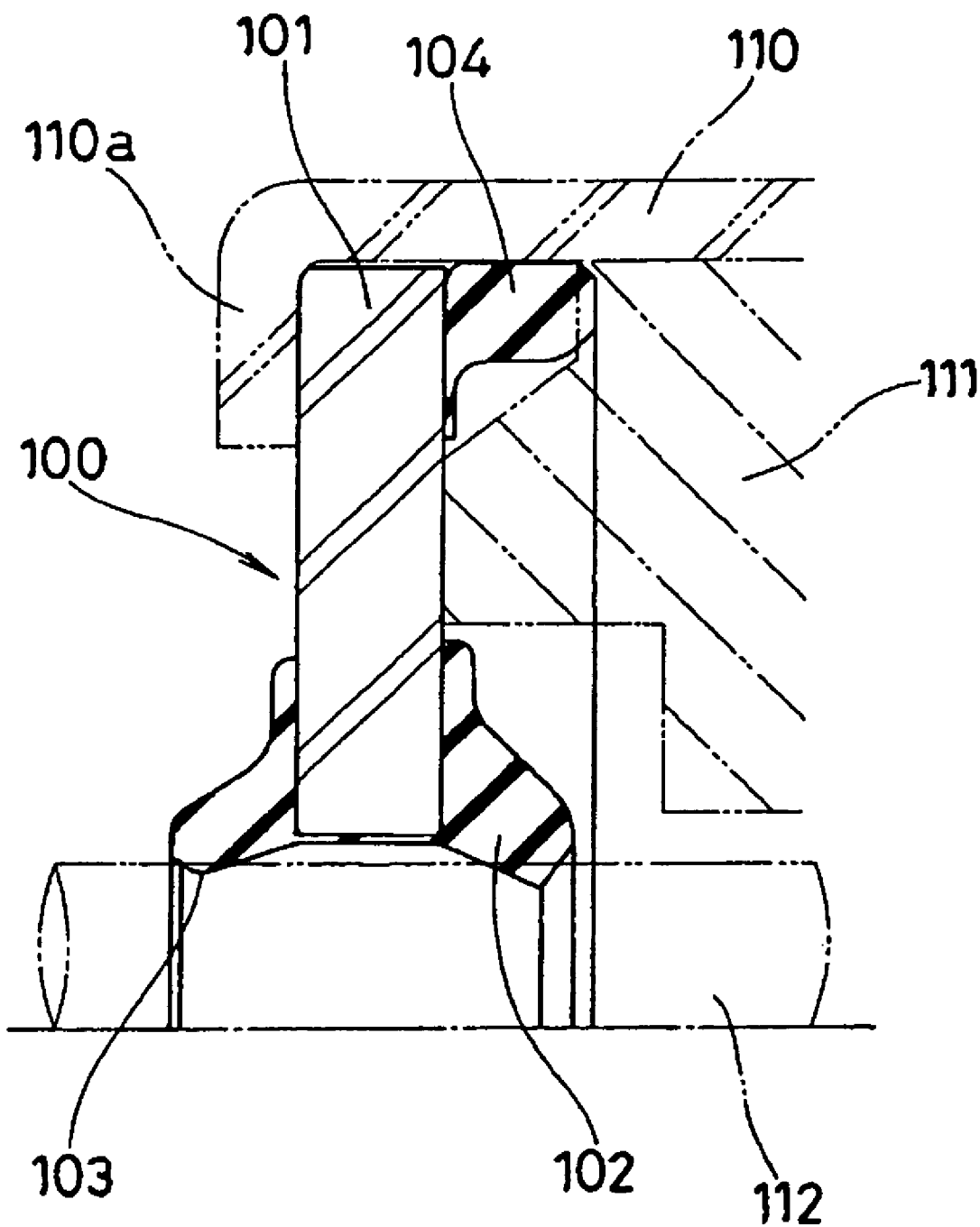
FIG. 5 is a half sectional view showing a conventional sealing device for a reciprocating shaft by cutting along a plane passing through an axis together with a part of a hydraulic shock absorber.

Next, FIG. 4 is a half sectional view showing a fourth embodiment of a sealing device for a reciprocating shaft in accordance with the present invention by cutting along a plane passing through an axis together with a part of a hydraulic shock absorber.

The sealing device 4 in accordance with the fourth embodiment of the present invention is provided with the washer 41, an auxiliary washer 47 fitted to the sealed space A side of the washer 41, the main lip 42 integrally bonded to the sealed space A side in an inner peripheral portion 47a of the auxiliary washer 47 and slidably brought into close contact with the outer peripheral surface 1a of the rod 1, the outer peripheral lip 46 integrally bonded to an outer peripheral portion 47b of the auxiliary washer 47 and brought into close contact with the inner surface of the cylinder 2, the backup ring 44 fitted to the portion between the inner peripheral portion of the main lip 42 and the inner peripheral portion 41a of the washer 41 and bearing the main lip 42 from the atmosphere B side and the inner peripheral side, and the dust lip 45 integrally bonded to the atmosphere B side of the washer 41 and slidably brought into close contact with the outer peripheral surface 1a of the rod 1, as shown in FIG. 4.

The washer 41 is manufactured by punching the thick metal plate in a donut shape, and the auxiliary washer 47 is formed by punching and pressing a thinner metal plate than the washer 41 in such a manner that a shape cut along a plane passing through an axis (an illustrated sectional shape) is formed approximately in an L shape. In other words, the auxiliary washer 47 is constituted by a disc portion 47a lapped over the sealed surface Aside of the washer 41, and an outer peripheral cylinder portion 47b extending to the atmosphere B side from an outer peripheral end portion thereof and pressure-inserted and fitted to the outer peripheral surface of the washer 41 with a proper fastening margin. Further, the washer 41 and the auxiliary washer 47 are held between the inward collar portion 21 and the rod guide 3, in a state in which the outer peripheral portion 41b of the washer 41 is brought into contact with the inner surface of the inward collar portion 21 formed in the end portion of the cylinder 2 so as to be bent to the inner peripheral side, and the disc portion 47a of the auxiliary washer 47 is brought into contact with the end surface 3a of the rod guide 3.

The main lip 42 and the outer peripheral lip 46 are molded by vulcanization with the rubber-like elastic material, and are integrally bonded by vulcanization to the auxiliary washer 47. In other words, the main lip 42 and the outer peripheral lip 46 are bonded by vulcanization to the auxiliary washer 47 at the same time of being molded, by setting the auxiliary washer 47, to which a vulcanization adhesive agent is previously applied, within a predetermined metal mold for the rubber vulcanization molding, charging an unvulcanized rubber material into the annular cavity defined between the auxiliary washer 47 and the inner surface of the metal mold on the basis of mold clamping, and heating and pressurizing it.

The main lip 42 extends toward the sealed space A side from the base portion 42a bonded by vulcanization to the inner peripheral portion of the disc portion 47a of the auxiliary washer 47, and the seal edge portion 42b formed in the leading end inner periphery thereof and the slidable surface 42c extending to the atmosphere B side therefrom are slidably brought into close contact with the outer peripheral surface 1a of the rod 1 with a proper fastening margin. Further, a plurality of grooves or protrusions 42d provided continuously in a circumferential direction for lubricating are formed in the slidable surface 42c.

The outer peripheral lip 46 extends toward the sealed space A side from the base portion 46a bonded by vulcanization to the surface in the sealed space A side in the outer peripheral portion of the disc portion 47a of the auxiliary washer 47, and is brought into close contact with the outer peripheral step portion 32 formed in the outer periphery of the contact portion with the auxiliary washer 47 in the rod guide 3 so as to be continuous in the circumferential direction, and the inner surface of the cylinder 2 with a proper fastening margin.

The dust lip 45 is molded by vulcanization with the rubber-like elastic material, extends toward the atmosphere B side from the base portion 45a integrally bonded by vulcanization to the inner peripheral portion 41a of the washer 41, and the leading end inner peripheral portion 45b is slidably brought into close contact with the outer peripheral surface 1a of the rod 1 with a proper fastening margin. The dust lip 45 is bonded by vulcanization to the washer 41 at the same time of being molded, by setting the washer 41, to which a vulcanization adhesive agent is previously applied, within a predetermined metal mold for the rubber vulcanization molding, charging an unvulcanized rubber material into the annular cavity defined between the washer 41 and the inner surface of the metal mold on the basis of mold clamping, and heating and pressurizing it.

The backup ring 44 is the same as the previously described first to third embodiments. In other words, the backup ring 44 is molded with the low-friction synthetic resin material such as the PTFE or the like, has the cut portion 44a at one position in the circumferential direction, and is fitted to the portion between the step-shaped supported surface 42e formed in the atmosphere B side of the slidable surface 42c of the main lip 42 so as to be continuous in the circumferential direction and the inner peripheral portion 41a of the washer 41.

In the sealing device 4 in accordance with the fourth embodiment structured as mentioned above, the main lip 42 is slidably brought into close contact with the outer peripheral surface 1a of the rod 1, thereby preventing the internal sealed oil in the sealed space A from leaking to the atmosphere B side through the outer periphery of the rod 1. The outer peripheral lip 46 is structured such as to seal the internal sealed oil between the cylinder 2 and the washer 41. The dust lip 45 is slidably brought into close contact with the outer peripheral surface 1a of the rod 1, thereby preventing the dust and the muddy water in the atmosphere B side from making an intrusion into the sealed space A through the outer periphery of the rod 1.

Since the main lip 42 is backed up from the inner peripheral side and the atmosphere A side by the backup ring 44 made of the synthetic resin material, it is possible to effectively suppress an increase of the tension force of the main lip 42 with respect to the outer peripheral surface 1a of the rod 1 at a time when the hydraulic pressure in the sealed space A is increased. As a result, it is possible to sufficiently improve a pressure tightness of the main lip 42 without making the inner diameter of the auxiliary washer 47 close to the outer diameter of the rod 1.

Further, since the sealing apparatus 4 is structured such that the molded body constituted by the washer 41 and the dust lip 45, and the molded body constituted by the auxiliary washer 47, the main lip 42 and the outer peripheral lip 46 are integrated in accordance with the pressure insertion and fitting between the washer 41 and the auxiliary washer 47, and the backup ring 44 is fitted to the portion between the main lip 42 and the washer 41 so as to be held, it is possible to easily install it at a time of assembling the hydraulic shock absorber.

INDUSTRIAL APPLICABILITY

As mentioned above, the present invention can be preferably used in the sealing device for the reciprocating shaft, which seals the reciprocating shaft of the hydraulic shock absorber of the vehicle and the like.

What is claimed is:

1. A sealing device for a reciprocating shaft, the sealing device being interposed between a shaft reciprocating in an axial direction and an outer peripheral member surrounding an outer periphery of the shaft, and a rod guide fixed on an inner periphery of the outer peripheral member, the sealing device comprising:

a washer held by said outer peripheral member and said rod guide and provided in a sealed space side in an inner peripheral portion with a main lip holding concave portion;

a main lip closely fitted and attached to the washer by said main lip holding concave portion so as to be continuous in a circumferential direction and slidably brought into close contact with an outer peripheral surface of said shaft;

an auxiliary lip integrally formed in an outer peripheral side of the main lip;

a backup ring fitted to a portion between an atmosphere side of a slidable surface of the main lip and a rising surface of the inner peripheral portion of said main lip holding concave portion of the washer, said main lip holding concave portion including the rising surface extending in a direction radially outwardly from the shaft and terminating in a surface extending perpendicular to the rising surface, and said backup ring bearing said main lip between the atmosphere side and the inner peripheral portion of the washer;

a dust lip integrally bonded to the atmosphere side of said washer and slidably brought into close contact with the outer peripheral surface of said shaft; and an outer peripheral lip integrally bonded to the outer peripheral portion of said washer and brought into close contact with said outer peripheral member, said auxiliary lip being in close contact with a cylindrical inner peripheral surface of said main lip holding concave portion and with an end surface of said rod guide, with fastening margins, the rod guide having a contact portion with said washer at the end surface and said rod guide being fixed to said outer peripheral member and said rod guide also having an inner peripheral surface closely faced to an outer peripheral surface of said shaft.

* * * * *